Patented Aug. 14, 1945

2,382,154

UNITED STATES PATENT OFFICE 2,382,154

SYNTHETIC STONE AND PROCESS OF MAKING IT

Paul W. Jones and John W. Swezey, La Fayette, Ind., assignors to Rostone Corporation, La Fayette, Ind., a corporation of Indiana No Drawing. Application September 11, 1941, Serial No. 410,430

4 Claims. (Cl. 106—118)

It is the object of our invention to produce synthetic stone and artificial structural material of increased strength, both against compression and against flexure.

Our present application is a continuation-in-part of our co-pending application Serial No. 149,274, filed June 19, 1937.

Our new synthetic stone is made mainly of alumino-silicic acid material, such as shales, slates, and clays, with an alkaline-earth base and water, indurated under moist heat. To that extent, our present invention follows the teaching of U. S. Patent No. 1,852,672, granted to Peffer, Harrison, and Ross on April 5, 1932; on which patent it is an improvement.

We have discovered the surprising fact that if in addition to the alumino-silicic acid material we use in the mixture with the alkaline-earth base and the water a relatively smaller amount of anhydrous alumino-silicate material, such as slag or fly-ash, we increase both the compressive strength and the flexural strength. This is the more surprising because synthetic stone and artificial structural material made of anhydrous alumino-silicate material, an alkaline-earth base, and water, with no alumino-silicic acid material—as set forth in U. S. Patent No. 1,942,769, granted to Peffer and one of us (Jones) on January 9, 1934—are weaker, both against compression and against flexure, than are those made of alumino-silicic acid material, an alkaline-earth base, and water; for that fact would lead one to expect that the addition of the anhydrous alumino-silicate material would weaken the product, instead of strengthening it as it unpredictably does.

By "alumino-silicic acid material" we mean those naturally occurring materials, such as shales, slates, clays, gneiss, and schists, which contain, at last in part, one or more of the alumino-silicic acids, and also contain in part water of constitution.

By "anhydrous alumino-silicate material" we mean materials which contain, at least in part, alumina and silica in combination, but which are generally considered as essentially having no water in their molecular constitution. Among this group of materials are various slags, clinker, and scoriae; and also "fly-ash," which is the finely powdered ash from the combustion of powdered coal; and also various naturally occurring alumino-silicate minerals, like lava and pumice and volcanic ash.

In carrying out our present invention we mix alumino-silicic acid material and a smaller amount of anhydrous alumino-silicate material with an alkaline-earth base and water, with the solid materials all in finely comminuted form; and subject the moist mass to moist heat to produce chemical reaction and induration.

The proportion of the anhydrous alumino-silicate material to the alumino-silicic acid material may vary considerably. Any amount of it is helpful, from about 5% (where the strengthening effect begins to be noticeable) usually up to about 90% by weight of the amount of the alumino-silicic acid material. But the optimum amount, for peak strength, is less than that 90%, and varies somewhat with the particular alumino-silicic acid material used. The optimum for high compressive strength is usually with the amount of anhydrous alumino-silicate material between 20% and 80% by weight of the amount of alumino-silicic acid material; while the optimum for high flexural strength is usually with that percentage between 25% and 60%. Taking both compressive and flexural strength into account it is usually found that the peak strength is with the amount of anhydrous alumino-silicate material between 25% and 50% by weight of the amount of alumino-silicic acid material.

The alkaline-earth base is most conveniently lime, either high-calcium or dolomitic; and while desirably of approximately sufficient amount and no more for substantially complete reaction with the alumino-silicic acid material and the anhydrous alumino-silicate material, it may in practice vary considerably in amount, from about 10% to about 75% (in terms of hydrated lime) of the combined weight of the alumino-silicic acid and anhydrous alumino-silicate materials, usually with best results if it is between 35% and 45% of that combined weight. The approximate amount of lime for maximum strength may be computed by adding 50% of the weight of the alumino-silicic acid material and 10% of the weight of the anhydrous alumino-silicate material.

The water should be sufficient in amount to produce thorough wetting. This is somewhat in excess of the amount required for reaction; and is usually equal to between 15% and 30% of the total weight of the solid ingredients. The water is desirably added only after the solid ingredients have been thoroughly comminuted and mixed in dry form.

The precise optimum proportions of these ingredients vary somewhat with different alumino-silicic acid materials, and for each such material a determination by test is necessary if the precise maximum strength is desired. But although the optimum proportions require tests, our invention is not limited to optimum proportions; for a marked and surprising beneficial effect on both compressive and flexural strengths, and on toughness, is obtained when any amount of essentially anhydrous alumino-silicate material up to about 80% to 90% of the amount of alumino-silicic acid material used is added to a mixture of alumino-silicic acid material, an alkaline-earth base, and water in making synthetic stone.

In performing our process, the anhydrous alumino-silicate material (if not already sufficiently fine), the alumino-silicic acid material, and the alkaline-earth base, are ground to desired fineness, preferably at least as fine as minus 200 mesh to minus 325 mesh per inch; and are thoroughly intermixed, desirably with all ingredients dry. Then the dry mixture is thoroughly mixed with the predetermined proportion of water, as in a muller or a wet pan, until the whole becomes a compact wetted mass in which there is intimate particle contact of colloidal or quasi-colloidal character. Then this wet mass is shaped as desired, as in molds, under pressure and/or tamping if desired. Then the shapes (or shaped masses) are subjected to moist heat, conveniently steam under pressure, but without complete drying, until the desired chemical reaction among the ingredients is effected. Final complete drying may then be done, in the air, or in an oven; but ordinarily this is neither desired nor necessary.

Example 1

In one practical example of our process, 5 parts (by weight) of shale (here an Indiana knobstone shale) containing alumino-silicic acid, 2 parts of fly-ash (here one obtained from the Detroit Edison Company), and 3 parts of hydrated (slaked) lime, all of sufficient fineness to pass through a 200-mesh or even through a 325-mesh screen, are thoroughly mixed while dry. Then 2 parts of water are added; and the whole is mixed, in a wet pan or similar machine, to produce a thoroughly wetted quasi-colloidal mass. This wet mass is now formed into the desired shapes, usually in molds; as by hydraulic pressing under pressures from 1500 to 6000 pounds per square inch, or by heavy tamping either on the mass itself or on a cover plate laid over it. The shaped mass is now put in an autoclave or indurating chamber; and, if desired after first being exposed to normal room conditions for several hours (as over night) although that need not be done, is subjected for about two hours to saturated steam at a pressure of about 50 to 125 pounds per square inch, conveniently about 75 pounds. This steam may either be introduced into the indurating chamber from outside, or be generated in the indurating chamber itself by heating the latter. During this two-hour induration the desired chemical reaction takes place, and the product reaches practically its full strength and is ready for use; although drying after the induration produces some further increase in strength.

The product thus obtained is definitely stronger than one similarly made with the fly-ash omitted; by at least 25% and usually more both in compressive strength and in flexural strength.

Example 2

The process of Example 1 is repeated, save that the proportions are varied to show effects of such variations and the wide range of proportions over which increased strength is obtained over what is obtained with the fly-ash left out.

The results are apparent from the following Tables A and B:

Table A

| Shale | Fly-ash | Lime | Compresive strength, lbs. per. sq. in. |
|---|---|---|---|
| 100 | 0 | 50 | 8,400 |
| 90 | 10 | 46 | 8,875 |
| 80 | 20 | 42 | 9,600 |
| 70 | 30 | 38 | 9,362 |

Table B

| Shale | Fly-ash | Lime | Flexural strength, lbs. per sq. in. |
|---|---|---|---|
| 100 | 0 | 50 | 2,045 |
| 75 | 25 | 40 | 2,350 |
| 50 | 50 | 30 | 2,065 |

In the tests of Tables A and B, the figures in the shale, fly-ash, and lime columns are parts by weight. The dry materials were thoroughly mixed by hand; an amount of water was used equal to 20% of the total weight of the dry ingredients; and the amount of lime in each case was 50% of the weight of shale plus 10% of the weight of fly-ash. The damp mixtures were pressed into the desired shapes at 2500 pounds per square inch in a hydraulic press, to produce a. 2-inch cubes
b. bars measuring ½ x 2 x 5 inches.

The cubes and bars were indurated by being subjected for two hours to saturated steam at a pressure of 75 pounds per square inch. The 2-inch cubes were used for the compression tests, by crushing in a testing machine. The bars were used for the flexure tests, by mounting them with a 4-inch clear span, and computing the flexural strength by the formula $$\frac{3Pl}{2bd^2}$$

in which

P = the breaking load
l = the span (4″)
b = the width (2″)
d = the thickness (½″)

Example 3

Example 2 was repeated using Goose Lake clay, from near Joliet, Illinois, with the results shown in the following Table C:

Table C

| Clay | Fly-ash | Lime | Flexural strength |
|---|---|---|---|
| 100 | 0 | 60 | 3,670 |
| 100 | 8 | 60 | 4,305 |
| 100 | 24 | 60 | 4,535 |
| 100 | 0 | 40 | 3,240 |
| 100 | 7 | 40 | 3,375 |
| 100 | 21 | 40 | 4,895 |
| 100 | 42 | 40 | 4,725 |

Example 4

Example 2 was repeated, using a shale obtained from near Streator, Illinois, and adding an amount of asbestos equal to 4% of the total weight of the dry ingredients; with the results shown in the following Tables D and E:

Table D

| Shale | Fly-ash | Lime | Compressive strength |
|---|---|---|---|
| 100 | 0 | 60 | 4,330 |
| 100 | 8 | 60 | 4,530 |
| 100 | 80 | 60 | 5,315 |
| 100 | 35 | 40 | 4,490 |
| 100 | 30 | 20 | 4,330 |

Table E

| Shale | Fly-ash | Lime | Flexural strength |
|---|---|---|---|
| 100 | 0 | 60 | 3,180 |
| 100 | 8 | 60 | 3,500 |
| 100 | 40 | 60 | 3,720 |
| 100 | 80 | 60 | 3,940 |
| 100 | 40 | 60 | 3,720 |
| 100 | 35 | 40 | 3,720 |
| 100 | 30 | 20 | 4,280 |

Example 5

Example 2 is repeated, using a shale obtained from near Brazil, Indiana, and adding an amount of asbestos equal to 4% of the total weight of the dry ingredients; with the results shown in the following Tables F and G, in which the upper and lower parts represent tests made at different times.

Table F

| Shale | Fly-ash | Lime | Compressive strength |
|---|---|---|---|
| 100 | 0 | 40 | 3,445 |
| 100 | 7 | 40 | 3,750 |
| 100 | 21 | 40 | 3,910 |
| 100 | 35 | 40 | 3,600 |
| 100 | 40 | 60 | 3,445 |
| 100 | 35 | 40 | 4,800 |
| 100 | 30 | 20 | 3,760 |

Table G

| Shale | Fly-ash | Lime | Flexural strength |
|---|---|---|---|
| 100 | 0 | 40 | 3,185 |
| 100 | 7 | 40 | 3,360 |
| 100 | 21 | 40 | 3,670 |
| 100 | 35 | 40 | 3,685 |
| 100 | 40 | 60 | 3,530 |
| 100 | 35 | 40 | 4,040 |
| 100 | 30 | 20 | 3,530 |

In the lower part of each of Tables D, E, F, and G, the weight of the fly-ash is always 25% of the sum of the weights of the shale and the lime.

As Examples 4 and 5 show, other ingredients may be included in addition to the alumino-silicic acid material, the anhydrous alumino-silicate material, the alkaline-earth base, and the water. These other ingredients may be coarse aggregates, such as crushed limestone, granite, marble, or the refuse called "chats" from lead and zinc ore; and/or they may be fibrous or lamellar material, such as the asbestos of Examples 4 and 5, organic fibers, or mica; and/or they may be talc or gypsum; and/or they may be mineral pigments, if color is desired.

In addition, after induration the synthetic stone produced may if desired be dried and impregnated, as with some water-repellant substance to prevent absorption of moisture, such for instance as oils or waxes, of either mineral or vegetable origin, or natural or synthetic resins.

But these latter things are incidentals. The fundamental thing is the added smaller amount of anhydrous alumino-silicate material to the alumino-silicic acid material, the alkaline-earth base, and the water.

We claim as our invention:

1. The method of producing synthetic stone or artificial structural material, which consists in mixing alumino-silicic acid material, an amount of anhydrous alumino-silicate material equal to between 5% and 90% by weight of the amount of alumino-silicic acid material, enough alkaline-earth base to produce reaction, and enough water to produce thorough wetting and form a compact wetted mass, with the solid ingredients all finely divided, and subjecting the mixture to induration under moist heat.

2. The method of producing synthetic stone or artificial structural material, which consists in mixing alumino-silicic acid material, an amount of anhydrous alumino-silicate material equal to between 25% and 50% by weight of the amount of alumino-silicic acid material, enough alkaline-earth base to produce reaction, and enough water to produce thorough wetting and form a compact wetted mass, with the solid ingredients all finely divided, and subjecting the mixture to induration under moist heat.

3. A synthetic stone or artificial structural material, comprising a compact mixture, indurated under moist heat, of alumino-silicic acid material, an amount of anhydrous alumino-silicate material equal to between 5% and 90% by weight of the amount of alumino-silicic acid material, enough alkaline-earth base to produce reaction, and enough water to produce thorough wetting and form a compact wetted mass, with the solid ingredients all finely divided.

4. A synthetic stone or artificial structural material, comprising a compact mixture, indurated under moist heat, of alumino-silicic acid material, an amount of anhydrous alumino-silicate material equal to between 25% and 50% by weight of the amount of alumino-silicic acid material, enough alkaline-earth base to produce reaction, and enough water to produce thorough wetting and form a compact wetted mass, with the solid ingredients all finely divided.

PAUL W. JONES.
JOHN W. SWEZEY.